Patented Dec. 15, 1936

2,064,116

UNITED STATES PATENT OFFICE 2,064,116

HYDRATION OF OLEFINES

George Frederick Horsley, Norton-on-Tees, England, assignor to Imperial Chemical Industries Limited, a corporation of Great Britain No Drawing. Application March 22, 1935, Serial No. 12,495. In Great Britain March 27, 1934

12 Claims. (Cl. 260—156)

This invention relates to the hydration of olefines.

This application is a continuation-in-part of my copending application Serial No. 691,078, filed September 26, 1933, and which has issued as U. S. Patent No. 2,015,073 dated September 24, 1935.

It has already been proposed in the hydration of ethylene to ethyl alcohol, to employ catalysts containing a phosphate of cadmium, beryllium, zinc, aluminium, tin, or lead. It has also been proposed to prepare alcohols by combining olefines with water in the vapour state at a temperature of at least 100° C. and in the presence of a metal of the platinum group, or gold, silver, copper, iron, cobalt, nickel, molybdenum, or manganese, or salts thereof, in particular, salts of weak inorganic acids, copper phosphate being specified as a suitable catalyst.

I have now found that particularly suitable catalysts for the hydration of olefines consist of or comprise aluminium metaphosphate with a metaphosphate of calcium, cadmium, zinc, or of divalent copper, nickel, tin or lead; or ferric metaphosphate with a metaphosphate of divalent manganese, cobalt, tin or lead.

I prefer to use aluminium metaphosphate with a metaphosphate of calcium, cadmium, zinc, or divalent copper or tin, or one of the catalysts hereinbefore mentioned containing ferric metaphosphate. Aluminium metaphosphate with calcium or cupric metaphosphate, and ferric metaphosphate with lead metaphosphate have been found to have particularly high activities.

Any suitable proportion of aluminium or ferric metaphosphate to the other metaphosphates may be used, but it is preferred to employ one to two molecular proportions of the former to about one molecular proportion of the latter.

The catalysts may be prepared in any suitable manner, e. g. by dissolving substances containing the metals, e. g. the metals themselves or their oxides or suitable salts in aqueous ortho-phosphoric acid, evaporating the solution and drying the solid product at a temperature increasing up to but not exceeding 300° C.

The reactions are preferably carried out in the vapour phase and at raised temperatures and pressures, for example, at temperatures of 250–300° C. and at pressures of 100 atmospheres or over. When working in the vapour phase, it is preferred to employ a large excess of olefine relative to water vapour, the gaseous reaction products being cooled to separate the aqueous solution of the alcohol, the surplus olefine being recirculated.

I claim:—

1. In a process for the catalytic hydration of olefines, the improvement which comprises carrying out the reaction in the presence of a catalyst comprising essentially aluminium metaphosphate associated with a metaphosphate of a metal selected from the group consisting of calcium, cadmium, zinc and divalent copper, nickel, tin and lead.

2. A process as claimed in claim 1, in which the catalyst is prepared by dissolving in aqueous ortho-phosphoric acid substances which are soluble therein and which contain a metal selected from the group consisting of calcium, cadmium, zinc, and divalent copper, nickel, tin, and lead, evaporating the solution and drying the solid product at a temperature increasing up to but not exceeding 300° C.

3. A process as claimed in claim 1 in which the catalyst comprises one to two molecular proportions of aluminium metaphosphate to about one molecular proportion of the other metal metaphosphate.

4. In a process for the catalytic hydration of olefines, the improvement which comprises carrying out the reaction in the presence of a catalyst comprising essentially ferric metaphosphate associated with a metaphosphate of a metal selected from the group consisting of divalent manganese, cobalt, tin and lead.

5. A process as claimed in claim 4, in which the catalyst is prepared by dissolving in aqueous ortho-phosphoric acid substances which are soluble therein and which contain a metal selected from the group consisting of calcium, cadmium, zinc, and divalent copper, nickel, tin, and lead, evaporating the solution and drying the solid product at a temperature increasing up to but not exceeding 300° C.

6. A process as claimed in claim 4, in which the catalyst comprises one to two molecular proportions of ferric metaphosphate to about one molecular proportion of the other metal metaphosphate.

7. In a process for the catalytic hydration of olefines, the improvement which comprises carrying out the reaction in the presence of a catalyst containing as its essential component a metaphosphate of a metal selected from the class consisting of iron and aluminum.

8. In a process for the catalytic hydration of olefines, the improvement which comprises carrying out the reaction in the presence of a promoted catalyst containing as its major component a metaphosphate of a metal selected from the class consisting of iron and aluminum.

9. In a process for the catalytic hydration of olefines, the improvement which comprises carrying out the reaction in the presence of a catalyst comprising essentially aluminum metaphosphate with calcium metaphosphate.

10. In a process for the catalytic hydration of olefines, the improvement which comprises carrying out the reaction in the presence of a catalyst comprising essentially aluminum metaphosphate with cupric metaphosphate.

11. In a process for the catalytic hydration of olefines, the improvement which comprises carrying out the reaction in the presence of a catalyst comprising essentially ferric metaphosphate with lead metaphosphate.

12. The process which comprises reacting in the vapor phase an olefine and water at a temperature of 250° to 350° C. and at a pressure in excess of 100 atmospheres in the presence of a catalyst containing as its essential component a metaphosphate of a metal selected from the class consisting of iron and aluminum.

GEORGE FREDERICK HORSLEY.